US006768767B1

(12) United States Patent
Miyahara

(10) Patent No.: US 6,768,767 B1
(45) Date of Patent: *Jul. 27, 2004

(54) GPS RECEIVER CAPABLE OF RECEIVING C/A AND P CODES ON MULTIPLE CHANNELS

(75) Inventor: Kazunori Miyahara, Kanagawa (JP)

(73) Assignee: Sokkia Company Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,226

(22) Filed: Oct. 13, 1998

(30) Foreign Application Priority Data

Nov. 13, 1997 (JP) .............................................. 9/312088

(51) Int. Cl.$^7$ .......................... H04B 1/69; H04B 7/185; G01S 5/02
(52) U.S. Cl. .................. 375/130; 375/147; 342/357.12; 342/357.06
(58) Field of Search ...................... 342/357.12, 357.06; 375/316, 130, 148, 147

(56) References Cited

U.S. PATENT DOCUMENTS

| | | | | |
|---|---|---|---|---|
| 4,928,106 A | * | 5/1990 | Ashjaee et al. | .............. 342/352 |
| 5,134,407 A | | 7/1992 | Lorenz et al. | |
| 5,245,628 A | * | 9/1993 | LaPadula et al. | ............ 375/148 |
| 5,535,237 A | * | 7/1996 | LaPadula et al. | ............ 342/352 |
| 5,535,278 A | * | 7/1996 | Cahn et al. | ............. 342/357.12 |
| 5,724,046 A | * | 3/1998 | Martin et al. | ........... 342/357.12 |

* cited by examiner

Primary Examiner—Temesghen Ghebretinsae
(74) Attorney, Agent, or Firm—Nixon Peabody, LLP

(57) ABSTRACT

The invention relates to a multi-channel type GPS receiver which is able to shorten the search time for a cold start, wherein a carrier tracking circuit 10, code tracking circuit 12, C/A code generator 14 are provided at the L1-C/A code receiving channel side, a C/A code generator 20 is provided at the L1-P code receiving channel side in addition to the code tracking circuit 16 and P code generator 18. Thereby, the code generator 20 and tracking circuit 16 are changed over and connected to each other by a switching means 22 when carrying out a search mode for a cold start. A C/A code generator 30 is provided at the L2-P code receiving channel side in addition to a carrier tracking circuit 24, code tracking circuit 26 and P code generator 28, whereby the code generator 30 is changed and connected to the tracking circuit 26 by a switching means 32 when carrying out the search mode during a cold start.

3 Claims, 3 Drawing Sheets

GPS RECEIVER CAPABLE OF RECEIVING C/A AND P CODES ON MULTIPLE CHANNELS

FIELD OF THE INVENTION

The present invention relates to a GPS receiver, and in particular relates to a multi-channel type GPS receiver which is able to shorten the search time during a cold start.

Furthermore, the invention relates to a GPS receiver by which a flexible channel configuration is enabled.

BACKGROUND ART

A GPS satellite sends electric wave signals in two frequency bands called L1 and L2.

This wave signal is such that the pseudonoise code (hereinafter called PN code) and navigation message are modulated by a DS spread spectrum modulation system.

The L1 wave is modulated by PN codes containing C/A codes (Coarse Acquisition codes) with a chip rate of 1/023 Mbps and code length of 1 ms, and a P code (Precision codes) with a chip rate of 10.23 Mpbs and code length of 7 DAYS, and the L2 wave is modulated by only normal P codes.

FIG.2 shows the general construction of an analog front end GPS receiver, which demodulates L1 and L2 electric wave signals received from a GPS satellite as described above.

The GPS receiver shown in the same drawing is provided with an antenna 1 which receives electric waves transmitted from satellites, an RF (radio frequency) amplifier 2 for amplifying the L1, an RF amplifier 3 for amplifying the L2 constituents, IF (intermediate frequency amplification) circuits 4,5 which are respectively connected to the amplifiers 2, 3 and includes a frequency conversion, A/D conversion circuits 6,7 for digitally converting the IF (intermediate frequency) signals outputted from the IF circuits 4,5, a PLL synthesizer 8 for sending out clock signal to each of the above mentioned circuits, and a TCXO 9 for giving the synthesizer 8 signals issued from a station.

Output signals L1 IF signals, L2 IF signals and clock signals sent from the A/D converting circuits 6,7 are inputted into a DSP (digital signal processor), wherein inverse spread spectrum (hereinafter called SS) modulation signal and data demodulation are carried out.

Furthermore, a digital signal processor (hereinafter merely called DSP), which carries out demodulation operations of a multi-channel type receiver, of the GPS receivers, has four to twelve independent channels. Differing from a sequencing receiver, satellites are independently assigned to a plurality of channels, wherein since transfer waves of the respective channels and the respective tracking circuits of PN code are always locked at satellites assigned to the respective channels, a continuous flow of quasi distance and transfer wave phase measurement values is generated.

FIG.3 shows the interior structure of one channel in a DSP of conventional multi-channel type GPS receiver. In the same drawing, a carrier tracking circuit, a code tracking circuit and a C/A code generator are provided at the L1-C/A code receiving channel side.

Furthermore, a carrier tracking circuit, a code tracking circuit and a P code generator are provided at the L1-P code receiving channel side.

Also, a carrier tracking circuit, a code tracking circuit and a P code generator are provided at the L2-P code receiving channel side.

In the DSP, carrier tracking and code tracking are executed by using each generator. The result is transmitted to the CPU. In the CPU which receives output signals from the DSP, position measurement calculation is carried out on the basis of the data obtained from each channel.

However, when this kind of GPS receiver begins to receive, a state where it is not known which satellite is assigned to the respective channels of the DSP is called Cold Start.

In the cold start, in the case of a receiver having eight satellite channels with respect to twenty-four GPS satellites available at present, any of L1 receiver or L1+L2 receiver is able to search for satellites which are able to receive signals with satellites, assigned to eight L1-C/A code channels one after another.

This is because the tracking element (almanac data) of satellites is old, the initial position is not reliable, or the time is not accurate, or the L1-C/A code cannot be demodulated by the receiving circuit at the L1, L2-P code receiving channel side.

Therefore, even in a case of this kind of multi-channel type GPS receiver, since the satellites to be assigned are not clear in the cold start, such a method has been employed, wherein satellites are assigned to the L1-C/A code receiving circuit one after another and are searched for with respect to which satellites of the twenty-four satellites can be received.

In such conventional GPS receivers described above, more search time is required in the cold start than in the warm start. For the time being, a user must wait. Therefore, shortening of the time required for the cold start was a large technical theme.

The present invention was developed in view of such a shortcoming in the conventional arts, and it is therefore an object of the invention to provide a GPS receiver by which the search time during the cold start can be shortened.

SUMMARY OF THE INVENTION AND ADVANTAGES

In order to achieve the above mentioned objective, in a multi-channel type GPS receiver which is able to respectively receive a plurality of channels and two kinds of C/A and P codes, a C/A code generator is changeably installed in a P code receiving channel of the receiver, the C/A code generator is operated when starting a cold start, and the P code receiving channel acts as a C/A code receiving channel.

According to the construction, since searching is carried out by using all the channels including the P code channel, it is possible to shorten the search time in comparison with the before mentioned conventional receivers, whereby the power consumption can be decreased.

Furthermore, in a multi-channel type GPS receiver which is able to receive two kinds of C/A and P codes in L1 and L2 frequency bands and is provided with a plurality of channels, a C/A code generator is changeably installed in each P code receiving channel for L1 and L2 frequency bands of said receiver, a C/A code and P code receiving channel for the L1 frequency band and a P code receiving channel for the L2 frequency band are used as they are, a C/A code and P code receiving channel for the L1 frequency band is used for receiving the C/A code for the L1 frequency band, and a C/A code and P code receiving channel for the L1 frequency band and P code receiving channel for the L2 frequency band are used for receiving the C/A code for the L1 frequency band.

According to this construction, a flexible channel configuration is enabled.

As has been made clear from the above description, a GPS receiver according to the invention can shorten the search time during the cold start. Therefore, the waiting time can also be shortened.

Furthermore, as a derivative effect, in a case where some channels of the DSP is accommodated in one IC package, for example, in a case where the L1-C/A, L1-P, L2-P is equivalent to four channels accommodated in one IC package, if a two-frequency receiver of twelve channels uses three ICs and is constructed as a one-frequency L1-C/A 12-channel receiver, only one IC is enough by setting all L1P and L2P in the L1-C/A receiving mode, whereby the efficiency of IC development can be further improved.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Hereinafter, a detailed description is given of a preferred embodiment of the invention with reference to the accompanying drawings.

Figure 1:
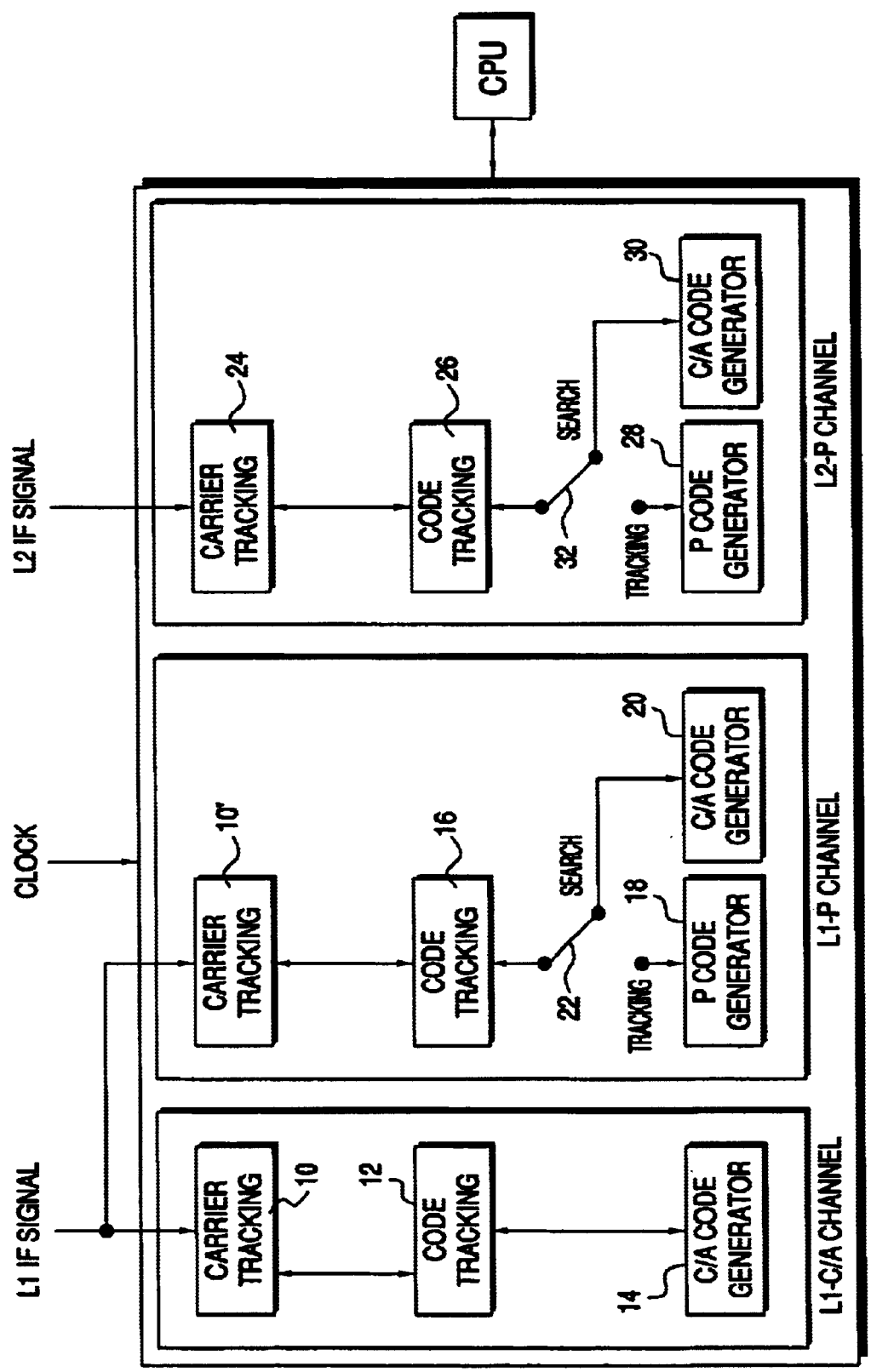
FIG. 1 is an explanatory view showing the interior construction of one channel in a multi-channel type DSP according to the invention.
Figure 2:
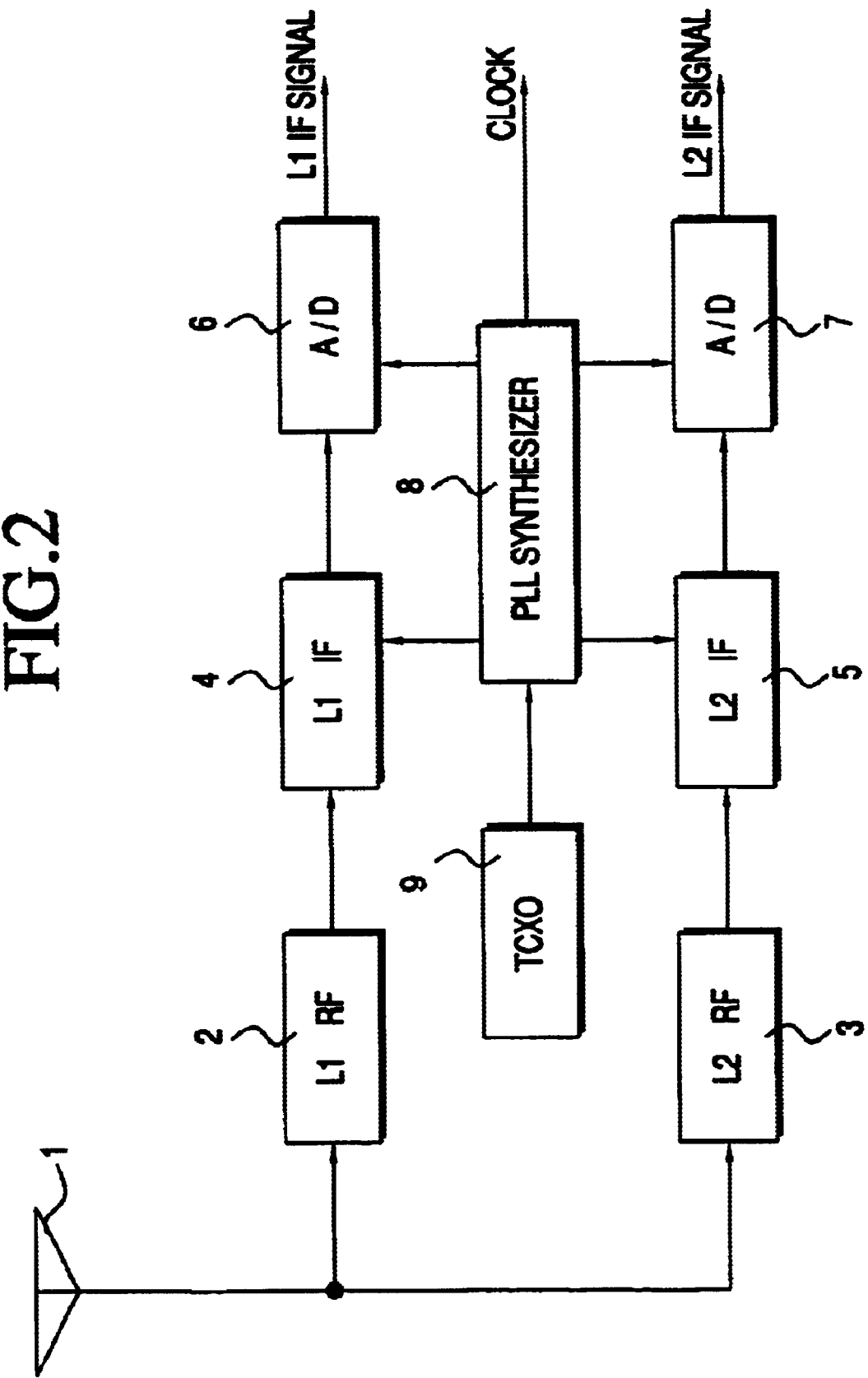
FIG. 2 is an explanatory view showing a general construction of the front end GPS/receiver which demodulates the L1/L2 electric waves.
Figure 3:
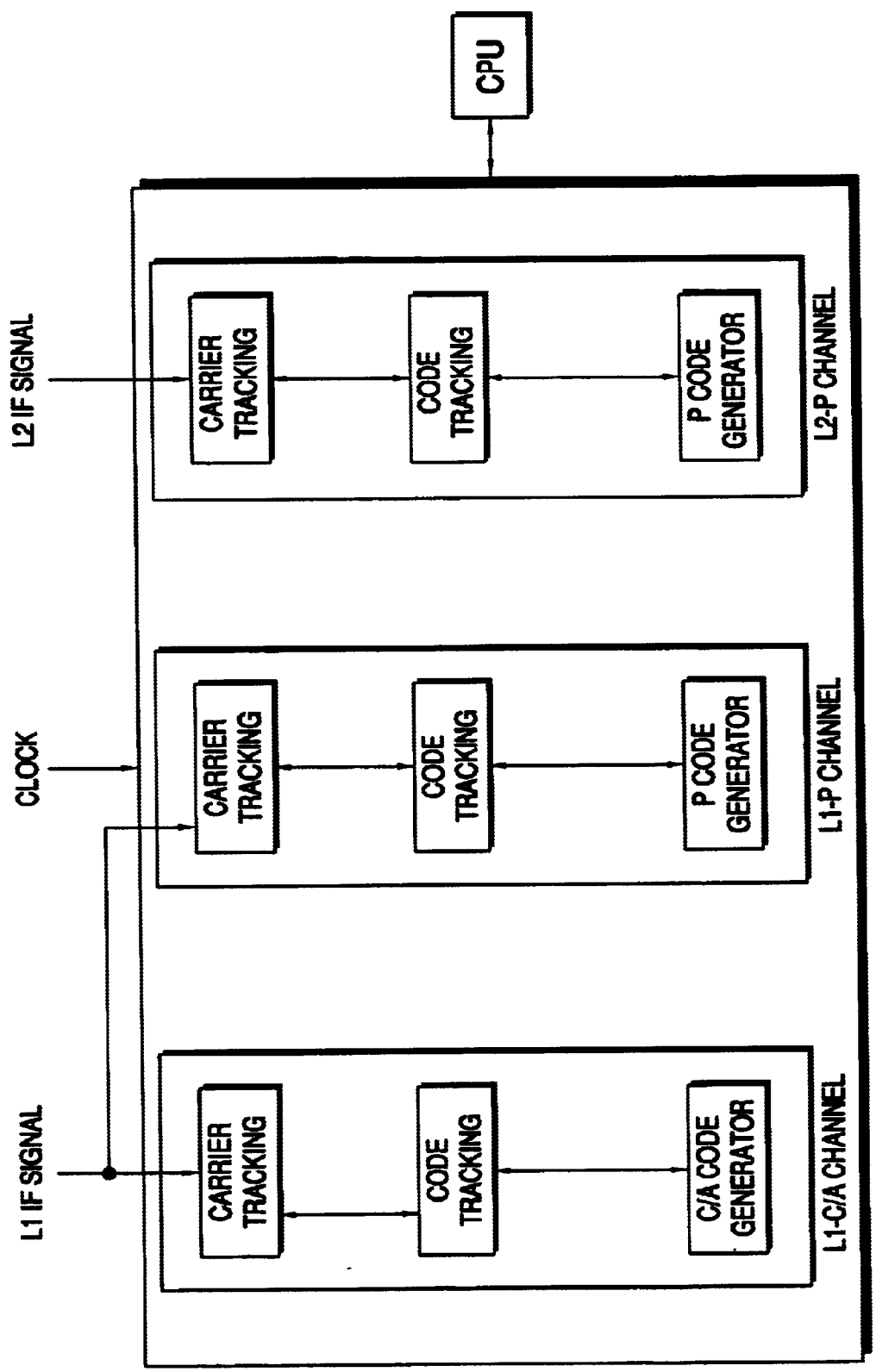
FIG. 3 is an explanatory view showing the interior construction of one channel in the conventional multi-channel type DSP.

FIG. 1 shows a preferred embodiment of a GPS receiver according to the invention. The GPS receiver according to the preferred embodiment has an analog front end as shown in FIG. 2, as in the prior art.

As shown in the same drawing, the GPS receiver is provided with an antenna 1 which receives electric waves transmitted from satellites, an RF (radio frequency) amplifier 2 for amplifying the L1, an RF amplifier 3 for amplifying the L2 constituents, IF (intermediate frequency amplification) circuits 4,5 which are respectively connected to the amplifiers 2, 3 and includes a frequency conversion, A/D conversion circuits 6,7 for digitally converting the IF (intermediate frequency) signals outputted from the IF circuits 4,5, a PLL synthesizer 8 for sending out clock signals to each of the above mentioned circuits, and a TCXO 9 for giving the synthesizer 8 signals issued from a station.

Output signals L1IF signals, L2IF signals and clock signals sent out from the A/D converting circuits 6,7 are inputted into the DSP, wherein inverse diffusion of SS modulation signals and data demodulation are carried out.

FIG. 1 shows the interior structure of one channel of the DSP. In the same drawing, as in prior art, a carrier tracking circuit 10, a code tracking circuit 12 and a C/A code generator 14 are provided at the L1-C/A code receiving channel side.

Furthermore, a C/A code generator 20 is provided at the L1-P code receiving channel side in addition to the carrier tracking circuit 10' code tracking circuit 16 and P code generator 18. It is constructed so that the C/A code generator 20 and code tracking circuit 16 are changed over and are connected by a switching means 22 in the search mode execution when a cold start is started.

Furthermore, a C/A code generator 30 is provided at the L2-P code receiving channel side in addition to the carrier tracking circuit 24, code tracking circuit 26, and P code generator 28. It is constructed so that the C/A code generator 30 and code tracking circuit 26 are changed over and are connected by a switching means 32 in the search mode execution when a cold start is started.

In the same drawing, it is shown that the switching means 22,32 are changed to the search mode execution in the case of a cold start. In this state, searching is enabled in all of the L1-C/A code receiving channel, L1-P code receiving channel and L2-P code receiving channel.

For example, in the case where the receiver is provided with eight channels and eight satellites are respectively assigned to each of the three code receiving channels, the search can be carried out with twenty-four satellites in all.

Therefore, satellites can be selected in the same time taken to perform warm start.

After the search is finished, satellites searched by the receiving channels and information to be seized are re-assigned to the L1-C/A code receiving channel for which the time is over although satellites are assigned, that is, the C/A code channel by which the receiving is disabled at present.

On the basis thereof, it becomes possible to quickly carry out the quasi distance measurement and transfer wave phase measurement. Furthermore, the carrier tracking circuit 10 of the above mentioned L1-C/A code receiving channel can be concurrently used for the L1-P code receiving channel.

In this case, the C/A code generator will not be required. However, the L2-P code receiving channel can be used for searching satellites. Therefore, the searching time can be shortened in comparison with prior art.

Furthermore, if clock supply to the respective C/A code generators 20,30 is stopped after the change, both of them enter their pause, whereby the power consumption can be saved.

Furthermore, the GPS receiver shown in FIG. 1 can be used for the following, whereby flexible channel construction is enabled.

Furthermore, in a case where the switching means 22, 32 are not changed, the C/A code and P code receiving channels for the L1 frequency band and P code receiving channel for the L2 frequency band can be used as they are.

Furthermore, by operating the switching means 22, the C/A code and P code receiving channels for the L1 frequency band and the P code receiving channel for the L2 frequency band can be used to receive the C/A code for the L1 frequency band.

Furthermore, if the switching means 22, 32 are caused to operate, C/A code and P code receiving channels for the L1 frequency band and P code receiving channel for L1 frequency band can be used to receive the C/A code for L1 frequency band.

What is claimed is:

1. A multi-channel GPS receiver comprising:
    a dedicated C/A code generator for an L1 C/A channel;
    a second C/A code generator and a P code generator configured to operate in an L1 P channel; and
    a third C/A code generator and a second P code generator configured to operate in an L2 P channel, wherein the L1 P and L2 P channels are capable of operating as L1 C/A code receiving channels during a cold start.

2. A multi-channel GPS receiver adapted to receive C/A and P codes in an L1 and an L2 frequency band comprising:

a plurality of C/A code generators that are selectively operable in each of a plurality of C/A and P code receiving channels for the L1 and L2 frequency bands;

a C/A code generator in a dedicated C/A code receiving channel that is used during a tracking operation for the L1 channel;

a P code generator in the L1 C/A and P code receiving channel that is used during a tracking operation for the L1 channel; and a P code generator in the L2 C/A and P code receiving channel that is used during the tracking operation for the L2 channel, wherein the C/A and P code receiving channel for the L1 frequency band is capable of receiving the C/A code for the L1 frequency band, and the L1 C/A and P code receiving channel and the L2 C/A and P code receiving channel are capable of processing the C/A code for the L1 frequency band.

3. A method of operating a GPS receiver comprising:

receiving a multi-channel GPS signal; and having a dedicated L1 C/A code receiving channel, an L1 C/A and P code receiving channel and an L2 C/A and P code receiving channel for receiving a C/A code for an L1 frequency band, wherein the L1 C/A and P and the L2 C/A and P code receiving channels are capable of processing P codes and C/A codes for the L1 frequency band.

* * * * *